(12) United States Patent
Matsushima et al.

(10) Patent No.: US 11,180,019 B2
(45) Date of Patent: Nov. 23, 2021

(54) SADDLE-TYPE ELECTRIC VEHICLE

(71) Applicants: HONDA MOTOR CO., LTD., Tokyo (JP); M-TEC Co., Ltd., Asaka (JP)

(72) Inventors: Satoshi Matsushima, Wako (JP); Toshitaka Akita, Wako (JP); Takafumi Irie, Wako (JP); Kinya Mizuno, Wako (JP); Makoto Mitsukawa, Wako (JP); Kunio Yoshimi, Asaka (JP); Masaya Murao, Asaka (JP); Yoshiki Kasaya, Asaka (JP); Shinichiro Nakazawa, Asaka (JP); Kazuma Deguchi, Asaka (JP)

(73) Assignees: HONDA MOTOR CO., LTD., Tokyo (JP); M-TEC Co., Ltd., Asaka (JP)

( * ) Notice: Subject to any disclaimer, the term of this patent is extended or adjusted under 35 U.S.C. 154(b) by 48 days.

(21) Appl. No.: 16/665,033

(22) Filed: Oct. 28, 2019

(65) Prior Publication Data
US 2020/0130498 A1 Apr. 30, 2020

(30) Foreign Application Priority Data

Oct. 30, 2018 (JP) .............................. JP2018-204325

(51) Int. Cl.
*B60K 7/00* (2006.01)
*H02K 11/33* (2016.01)
(Continued)

(52) U.S. Cl.
CPC ............ *B60K 7/0007* (2013.01); *B60L 50/50* (2019.02); *H02K 11/33* (2016.01);
(Continued)

(58) Field of Classification Search
CPC ............ B60K 7/007; B60K 2007/0061; B60K 2007/0046; B60K 11/02; B60K 17/043;
(Continued)

(56) References Cited

U.S. PATENT DOCUMENTS 5,501,292 A * 3/1996 Kawashima ............. B62J 43/16
180/220
5,758,736 A * 6/1998 Yamauchi ................ B62M 6/55
180/220
(Continued)

FOREIGN PATENT DOCUMENTS

CN 2660773 12/2004
CN 101707412 5/2010
(Continued)

OTHER PUBLICATIONS

Indian Office Action for Indian Patent Application No. 201944043670 dated Jul. 16, 2020.
(Continued)

*Primary Examiner* — Emma K Frick
(74) *Attorney, Agent, or Firm* — Amin, Turocy & Watson, LLP

(57) ABSTRACT

An electric bicycle includes a motor that includes a stator and a rotor and that is driven by a battery, a reduction gear, an output shaft configured to output power of the motor, a sprocket fixed to the output shaft, a housing, and a water jacket configured to cool the motor. The water jacket includes a flange section protruding outward in a radial direction of the stator, the flange section being formed in the water jacket at a side opposite to the reduction gear in a vehicle width direction.

9 Claims, 8 Drawing Sheets

(51) Int. Cl.
B60L 50/50 (2019.01)
B60K 1/00 (2006.01)
(52) U.S. Cl.
CPC ..... *B60K 2001/006* (2013.01); *B60L 2200/12* (2013.01); *B62K 2204/00* (2013.01)
(58) Field of Classification Search
CPC .......... B60K 2001/006; B60L 2200/12; B60Y 2400/61; B60Y 2200/12; B62K 2204/00
See application file for complete search history.

(56) References Cited

U.S. PATENT DOCUMENTS

| | | | |
|---|---|---|---|
| 6,263,993 B1* | 7/2001 | Lin | B62M 6/55 180/206.4 |
| 9,010,476 B2* | 4/2015 | Matsuda | B62K 25/283 180/220 |
| 9,073,425 B2* | 7/2015 | Vogler | B60L 15/2036 |
| 9,290,226 B2* | 3/2016 | Nitta | B62K 11/04 |
| 9,315,231 B2* | 4/2016 | Gingl | B62M 6/55 |
| 9,381,802 B2* | 7/2016 | Figuered | B60K 17/356 |
| 9,758,213 B2* | 9/2017 | Kawakami | B62M 6/55 |
| 9,973,066 B2 | 5/2018 | Tchervenkov et al. | |
| 10,000,255 B2* | 6/2018 | Shahana | B62M 6/55 |
| 10,270,314 B2* | 4/2019 | Matsuda | B60L 3/0061 |
| 10,272,767 B1* | 4/2019 | Tang | F01P 7/164 |
| 10,500,940 B2* | 12/2019 | Garcia | B60K 17/16 |
| 10,632,840 B2* | 4/2020 | Orimo | B60K 17/08 |
| 10,637,329 B2* | 4/2020 | Heeke | H02K 9/19 |
| 2012/0132473 A1* | 5/2012 | Weber | B60K 7/0007 180/58 |
| 2012/0132476 A1 | 5/2012 | Gastineau et al. | |
| 2013/0119793 A1 | 5/2013 | Hofkirchner et al. | |
| 2013/0270038 A1 | 10/2013 | Nitta | |
| 2014/0152076 A1 | 6/2014 | Vogler et al. | |
| 2014/0345421 A1 | 11/2014 | Gingl et al. | |
| 2015/0108823 A1 | 4/2015 | Figuered et al. | |
| 2016/0134180 A1 | 5/2016 | Tchervenkov et al. | |
| 2016/0236748 A1 | 8/2016 | Matsuda | |
| 2017/0331348 A1 | 11/2017 | Mayor | |
| 2018/0154771 A1 | 6/2018 | Orimo | |

FOREIGN PATENT DOCUMENTS

| | | |
|---|---|---|
| CN | 102223007 | 10/2011 |
| CN | 203645464 | 6/2014 |
| CN | 106026449 | 10/2016 |
| CN | 106067710 | 11/2016 |
| CN | 205864190 | 1/2017 |
| CN | 206135624 | 4/2017 |
| CN | 106655557 | 5/2017 |
| CN | 206432832 | 8/2017 |
| CN | 206686012 | 11/2017 |
| CN | 107725174 | 2/2018 |
| EP | 0859447 | 8/1998 |
| EP | 2636583 | 9/2013 |
| JP | 10-176617 | 6/1998 |
| JP | 2012-096594 | 5/2012 |
| WO | 2015/049711 | 3/2017 |

OTHER PUBLICATIONS

Chinese Office Action for Chinese Patent Application No. 201911034638.6 dated Aug. 31, 2021.

* cited by examiner

SADDLE-TYPE ELECTRIC VEHICLE

CROSS-REFERENCE TO RELATED APPLICATION

Priority is claimed on Japanese Patent Application No. 2018-204325, filed Oct. 30, 2018, the content of which is incorporated herein by reference.

BACKGROUND OF THE INVENTION

Field of the Invention

The present invention relates to a saddle-type electric vehicle.

Description of Related Art

For a saddle-type electric vehicle, a configuration including a motor configured to generate a traveling driving force, and a reduction gear configured to reduce an output of the motor is known (for example, see Japanese Unexamined Patent Application, First Publication No. 2012-96594). In the electric bicycle disclosed in Japanese Unexamined Patent Application, First Publication No. 2012-96594, an electric motor is accommodated in a case in a horizontally housed state in which a rotary shaft is disposed in a leftward/rightward direction, a gear fixed to the rotary shaft disposed on the left side is meshed with a reduction gear rotatably provided in the case, and the reduction gear is meshed with a gear of a counter shaft that is also rotatably provided in the case. Further, the counter shaft protrudes leftward from the case, and a front sprocket is fixed to the protruding portion.

SUMMARY OF THE INVENTION

Incidentally, a water jacket configured to cool a stator is provided on a motor. The water jacket is disposed in a case that accommodates a stator to surround the stator. However, in a case in which a reduction gear is disposed on a side of the motor, when the water jacket is attached to or detached from the case, the reduction gear becomes a hindrance and maintenance properties can deteriorate.

An aspect of the present invention is directed to providing a saddle-type electric vehicle in which maintenance properties of a motor are improved.

(1) A saddle-type electric vehicle according to an aspect of the present invention includes a motor that includes a stator and a rotor and that is driven by a power supply from a battery; a reduction gear that is disposed on one side of the motor in a vehicle width direction and that is configured to reduce a speed of output of the motor; an output shaft that extends in the vehicle width direction and that is configured to output power of the motor in which the speed thereof has been reduced by the reduction gear; a sprocket that is fixed to the output shaft and that is disposed on the other side of the motor in the vehicle width direction; a housing having an accommodating space in which the stator and the rotor are accommodated; and a water jacket that is disposed to surround the stator in the accommodating space and that is configured to cool the motor, wherein the water jacket includes a flange section protruding outward in a radial direction of the stator, the flange section being formed in the water jacket at a side opposite to the reduction gear in the vehicle width direction.

According to the aspect of the above-mentioned (1) of the present invention, during maintenance of the motor that requires attachment and detachment of the water jacket, the water jacket is displaced toward a side opposite to the reduction gear in the vehicle width direction, and the water jacket can be removed from the housing while avoiding interference with the flange section and the housing. That is, the water jacket can be attached to and detached from the motor without removing the reduction gear. Accordingly, improvement in maintenance properties of the motor can be achieved.

(2) In the saddle-type electric vehicle according to the aspect of the above-mentioned (1), the housing may include a first member and a second member, the first member and the second member may be fastened to each other while having the flange section sandwiched between the first member and the second member, and a through-hole through which the output shaft is inserted may be formed in the flange section.

According to the aspect of the above-mentioned (2) of the present invention, since the fastening section between the first member and the second member is provided on the outer circumferential side of the flange section with respect to the through-hole, even though the fastening section between the first member and the second member is not provided on the inner circumferential side of the flange section with respect to the through-hole, the first member and the second member can be fastened throughout the circumference of the flange section.

Accordingly, the output shaft can be disposed at a position closer to the stator while securing sealability between the flange section and the housing. Accordingly, reduction in size of an apparatus including the motor and the output shaft can be achieved.

(3) The saddle-type electric vehicle according to an aspect of the above-mentioned (1) or (2) may further include a bearing configured to rotatably support the output shaft with respect to the housing; and gaskets interposed between the flange section and the housing, wherein the bearing overlaps the gaskets between the output shaft and the stator when seen from the vehicle width direction.

According to the aspect of the above-mentioned (3) of the present invention, since the bearing configured to support the output shaft overlaps the gaskets, which is disposed between the output shaft and the stator when seen from the vehicle width direction, when seen from the vehicle width direction, the output shaft can be disposed at a position more closer to the stator. Accordingly, reduction in size of an apparatus including the motor and the output shaft can be achieved while securing sealability between the flange section and the housing using the gaskets.

(4) In the saddle-type electric vehicle according to the aspect of any one of the above-mentioned (1) to (3), a discharge port configured to discharge cooling water from the water jacket may be formed in the housing, and the discharge port may be provided on a side surface of the other side of the housing in the vehicle width direction.

According to the aspect of the above-mentioned (4) of the present invention, since the discharge port is disposed at a side opposite to the reduction gear while having the housing sandwiched between the reduction gear and the discharge port, when the pipeline is attached to and detached from the discharge port, the reduction gear does not become a hindrance. Accordingly, during maintenance of the motor that requires attachment and detachment of the pipeline, improvement of maintenance properties can be achieved.

(5) In the saddle-type electric vehicle of the aspect according to any one of the above-mentioned (1) to (4), a flow path spirally extending around the stator may be formed in the water jacket.

According to the aspect of the above-mentioned (5) of the present invention, the entire stator can be cooled evenly. Accordingly, it is possible to provide the saddle-type electric vehicle in which the motor has good cooling performance.

(6) The saddle-type electric vehicle according to the aspect of any one of the above-mentioned (1) to (5) may further include an inverter configured to convert current supplied from the battery into alternating current and configured to supply the current to the motor, wherein the inverter is disposed below the motor, and cooling water supplied to the water jacket goes through the inverter.

According to the aspect of the above-mentioned (6) of the present invention, the inverter and the motor can be cooled using a single flow path of cooling water. Accordingly, a structure of the apparatus including the motor and the inverter can be simplified, and improvement in maintenance properties of the motor can be achieved.

According to the aspect of the present invention, improvement in maintenance properties of the motor can be achieved.

DETAILED DESCRIPTION OF THE INVENTION

Figure 1:
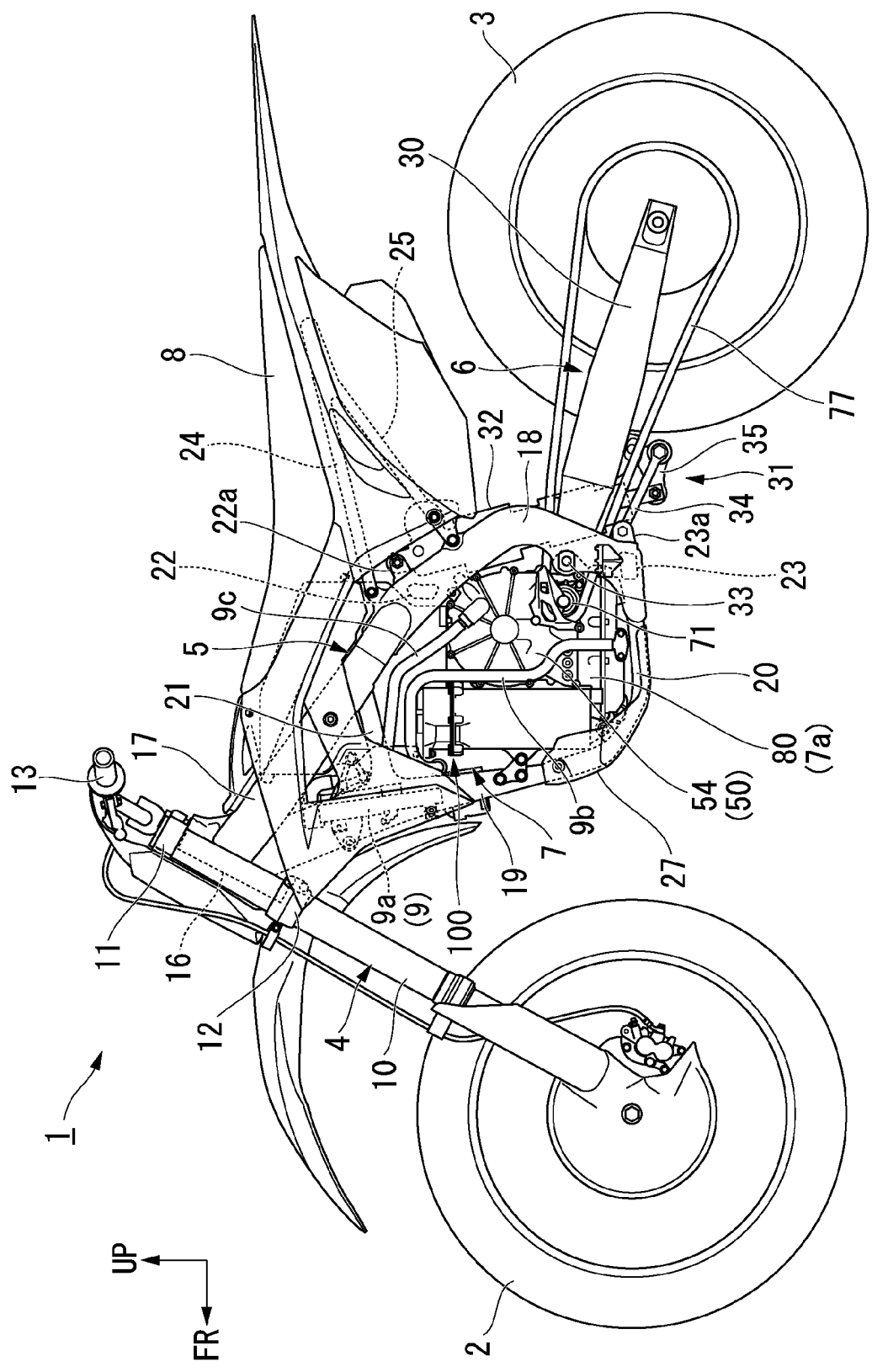
FIG. 1 is a left side view of an electric bicycle of an embodiment.

Hereinafter, an embodiment of the present invention will be described with reference to the accompanying drawings. Further, directions of forward, rearward, upward, downward, leftward, rightward, and so on, in the following description are the same as directions in a vehicle described below. That is, an upward/downward direction coincides with a vertical direction and a leftward/rightward direction coincides with a vehicle width direction. In a vehicle width direction, a direction separated from a vehicle width center is referred to as an outward direction in the vehicle width direction. In addition, in the drawings used in the following description, an arrow UP indicates an upward direction with respect to a vehicle, an arrow FR indicates a forward direction with respect to the vehicle and an arrow LH indicates a leftward direction with respect to the vehicle.

FIG. 1 is a left side view of an electric bicycle of an embodiment.

As shown in FIG. 1, an electric bicycle 1 of the embodiment is an offroad type saddle-type electric vehicle. The electric bicycle 1 includes a front wheel 2, a rear wheel 3, a front wheel suspension system 4, a vehicle body frame 5, a rear wheel suspension system 6, a power unit 7, a seat 8 and a cooling apparatus 9.

The front wheel suspension system 4 includes a pair of left and right front forks 10 configured to axially support the front wheel 2 on lower end portions thereof, a top bridge 11 and a bottom bridge 12 provided to cross upper sections of the pair of front forks 10, a steering stem (not shown) provided to cross the top bridge 11 and the bottom bridge 12 and inserted through a head pipe 16, and a steering handle 13 supported on the top bridge 11. The front wheel 2 is steerably supported by the head pipe 16 of the vehicle body frame 5 via the front wheel suspension system 4.

The vehicle body frame 5 includes the head pipe 16, a pair of left and right main frames 17, a pair of left and right pivot frames 18, a single down frame 19, a pair of left and right lower frames 20, a pair of left and right gussets 21, a cross member 22 and a lower cross member 23, which are integrally coupled to each other through welding or the like.

The head pipe 16 is provided on a front end of the vehicle body frame 5. The head pipe 16 supports a steering stem. The pair of main frames 17 extends rearward and downward from an upper section of the head pipe 16 to be branched off leftward and rightward. The pair of main frames 17 extend to be curved to swell outward in a vehicle width direction behind the head pipe 16 in a plan view seen from above. The pair of pivot frames 18 extend downward from rear end portions of the main frames 17, respectively. A pivot shaft 33 extending in the vehicle width direction bridges between lower sections of the pair of pivot frames 18. The down frame 19 extends downward from a lower section of the head pipe 16. The pair of lower frames 20 extend rearward from a lower end portion of the down frame 19 to be branched off leftward and rightward, and connected to lower end portions of the pivot frames 18, respectively.

The pair of gussets 21 connect the main frames 17 and the down frame 19 above a motor 50 of the power unit 7. The pair of gussets 21 extend rearward from an upper section of the down frame 19 to be branched off leftward and rightward, respectively, and are connected to lower sections of the main frames 17. The cross member 22 extends in the vehicle width direction, and connects upper sections of the pair of pivot frames 18. A cushion support bracket 22a extending rearward and upward is fixed to a central section of the cross member 22 in the vehicle width direction. A rear cushion 32 (to be described below) is connected to the cushion support bracket 22a. The lower cross member 23 extends in the vehicle width direction, and connects lower end portions of the pair of pivot frames 18 below the pivot shaft 33. A link support bracket 23a extending rearward is fixed to the lower cross member 23. A link arm 34 (to be described below) is connected to the link support bracket 23a.

The vehicle body frame 5 further includes a pair of left and right seat rails 24 and a pair of left and right support rails 25. The pair of seat rails 24 are connected to upper end portions of the pivot frames 18, respectively, and extend rearward and upward from the pivot frames 18. The pair of seat rails 24 support the seat 8 from below. The pair of support rails 25 are connected to the pivot frames 18 below the seat rails 24, respectively. The pair of support rails 25 extend rearward and upward from the pivot frames 18 and are connected to the seat rails 24.

The vehicle body frame 5 is a semi-double cradle type. The vehicle body frame 5 is provided below the left and right main frames 17 behind the head pipe 16, and the power unit 7 including the motor 50 and a battery 100 is mounted in front of the left and right pivot frames 18. The vehicle body frame 5 surrounds the power unit 7 with the single down frame 19 and the left and right lower frames 20 from the front and below.

The rear wheel suspension system 6 includes a swing arm 30 configured to axially support the rear wheel 3 on a rear end portion thereof, a link mechanism 31 connected to a front section of the swing arm 30 and lower sections of the pair of pivot frames 18, and the rear cushion 32 that bridges the link mechanism 31 and the cross member 22.

The swing arm 30 is provided below the rear section of the vehicle body. The swing arm 30 extends forward and rearward. A front end portion of the swing arm 30 is formed in a bifurcated shape branched off leftward and rightward, and vertically swingably supported by the pair of pivot frames 18 via the pivot shaft 33.

The link mechanism 31 has the link arm 34 and a link member 35. The link arm 34 is provided below the swing arm 30 when seen in a side view. The link arm 34 extends forward and rearward. A front end portion of the link arm 34 is pivotably connected to the link support bracket 23a of the lower cross member 23. The link member 35 is formed in a triangular shape when seen in a side view. An upper section of the link member 35 is pivotably connected to a longitudinal intermediate section of the swing arm 30. A rear lower section of the link member 35 is pivotably connected to a rear end portion of the link arm 34. The rear cushion 32 is connected to a front section of the link member 35.

The rear cushion 32 is provided on a vehicle width center of the rear section of the vehicle body. The rear cushion 32 is formed in a tubular shape, and extends upward and downward in the axial direction (the longitudinal direction) inclined forward. An upper end portion of the rear cushion 32 is pivotably connected to the cushion support bracket 22a of the cross member 22. A lower end portion of the rear cushion 32 is pivotably connected to a front section of the link member 35.

Figure 2:
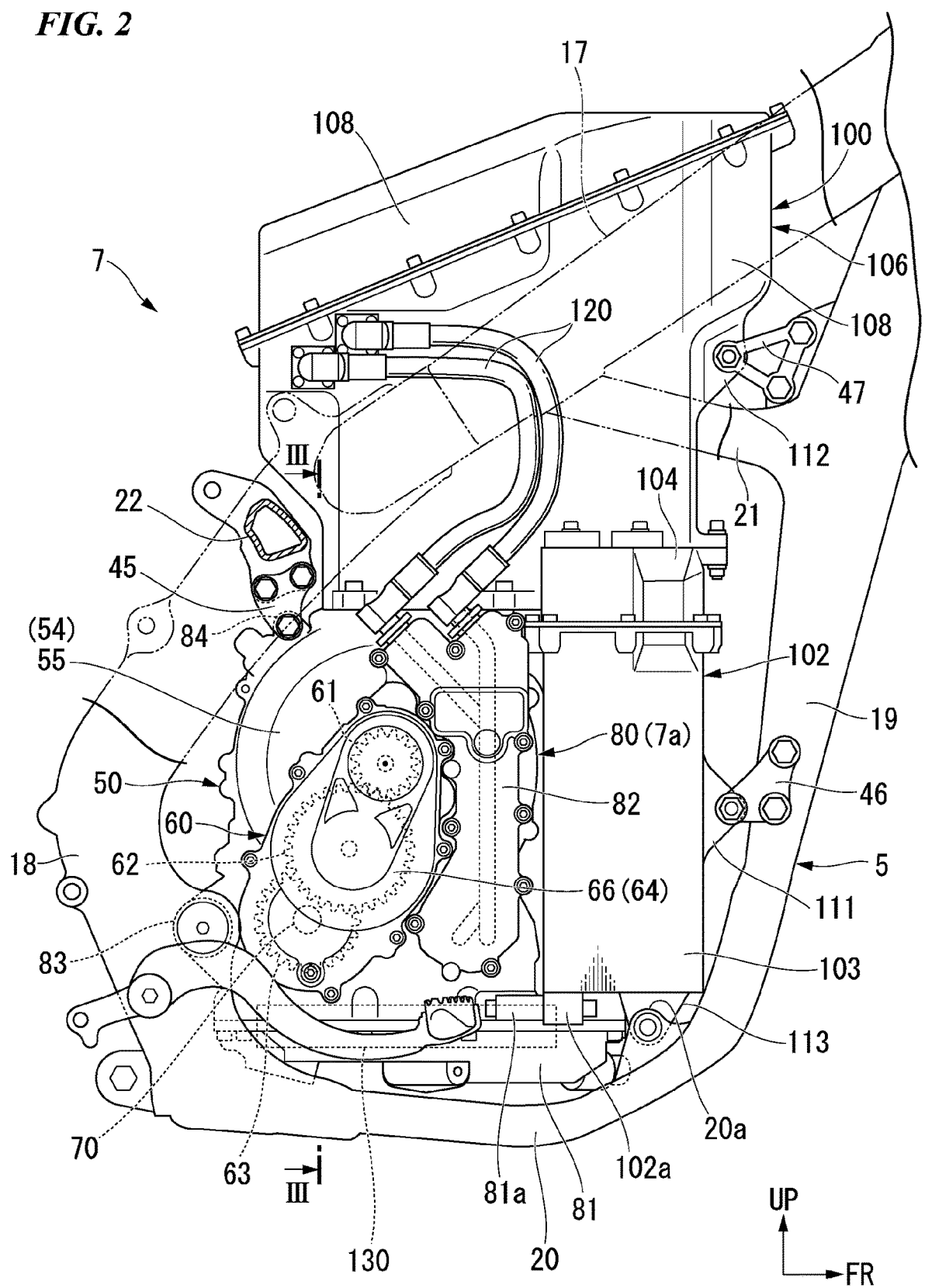
FIG. 2 is an enlarged right side view of a part of the electric bicycle of the embodiment.

FIG. 2 is an enlarged right side view of a part of the electric bicycle of the embodiment.

As shown in FIG. 2, the power unit 7 includes the motor 50 for driving the vehicle, a water jacket 90 configured to cool the motor 50, a reduction gear 60 configured to reduce a speed of output of the motor 50, an output shaft 70 configured to output power of the motor 50 in which the speed thereof has been reduced in the reduction gear 60, the battery 100 that is a power source of the motor 50, a power control unit (PCU, an inverter) 130 configured to control the motor 50, a drive unit of the motor 50 and the reduction gear 60, and a housing 80 configured to accommodate the PCU 130. The power unit 7 is fixedly supported by the vehicle body frame 5.

The power unit 7 is disposed behind the down frame 19 when seen in a side view and above the lower frame 20. In addition, the power unit 7 is disposed to be sandwiched between the pair of main frames 17 and the pair of pivot frames 18 from an outward side in the vehicle width direction. A lower section of the power unit 7 is covered with an undercover 27 attached to the lower frame 20 (see FIG. 1).

The motor 50, the reduction gear 60, the output shaft 70, the water jacket 90, the PCU 130 and the housing 80 are integrally unitized as a drive apparatus 7a. The motor 50 is disposed on a rear section of the power unit 7. The reduction gear 60 is disposed on an outward side (a right side) of the motor 50 in the vehicle width direction. The PCU 130 is disposed below the motor 50. The housing 80 forms an outer shell of the drive apparatus 7a.

Figure 3:
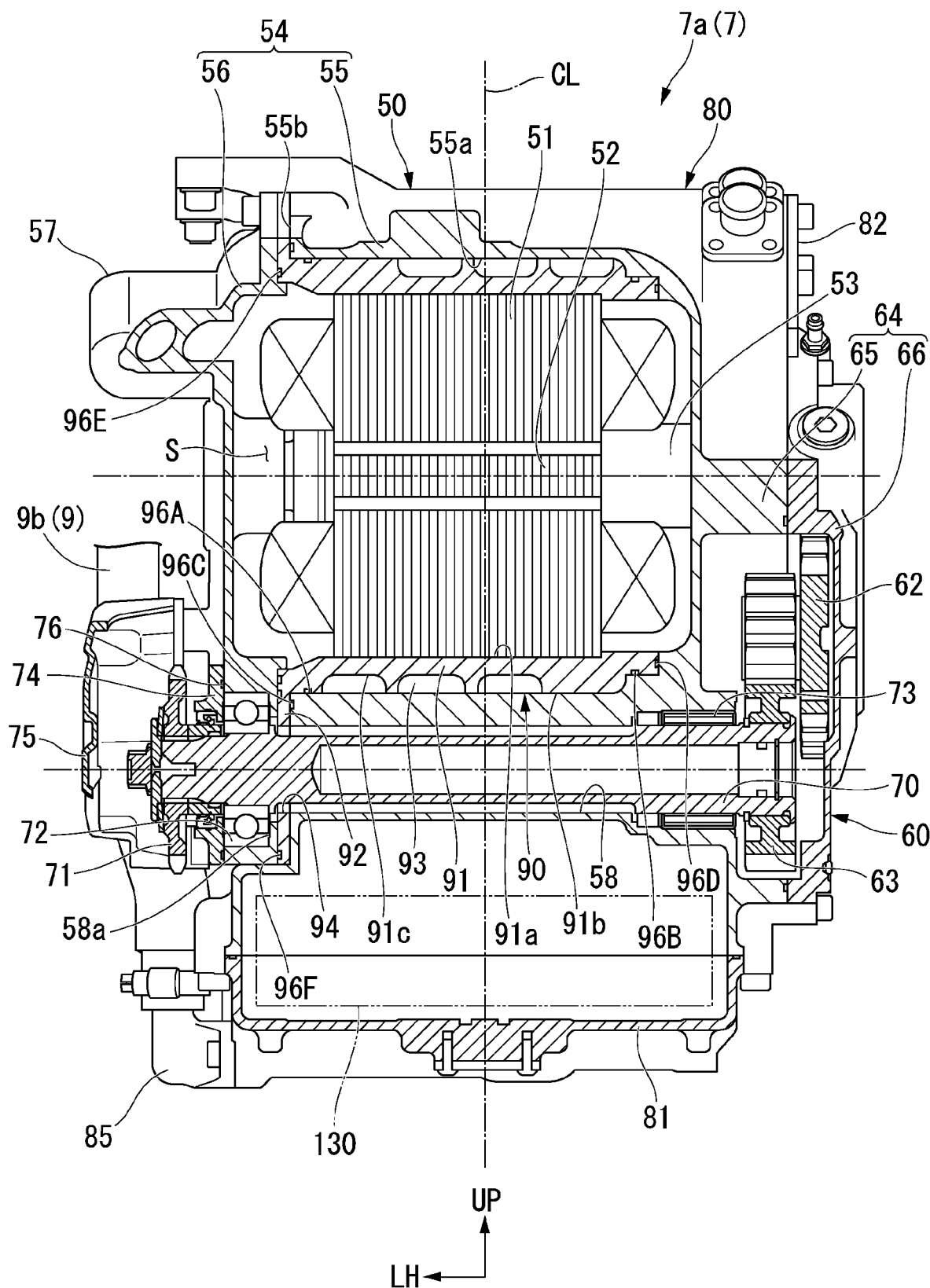
FIG. 3 is a cross-sectional view taken along line III-III in FIG. 2.

FIG. 3 is a cross-sectional view taken along line in FIG. 2.

As shown in FIG. 3, the motor 50 is disposed on a vehicle width center CL. The vehicle width center CL is a virtual line overlapping a central axis of the head pipe 16 when seen from the forward/rearward direction. The motor 50 includes a stator 51 and a rotor 52, and a motor case 54 configured to accommodate the stator 51 and the rotor 52.

The stator 51 is formed in a cylindrical shape extending in the vehicle width direction. The stator 51 is fixed to the motor case 54 via the water jacket 90. The rotor 52 is disposed inside the stator 51. The rotor 52 is disposed coaxially with the stator 51. The rotor 52 is rotatably provided around an axis extending in the vehicle width direction. A motor shaft 53 extending in the vehicle width direction is fixed to the rotor 52. The motor shaft 53 is rotated integrally with the rotor 52.

Figure 4:
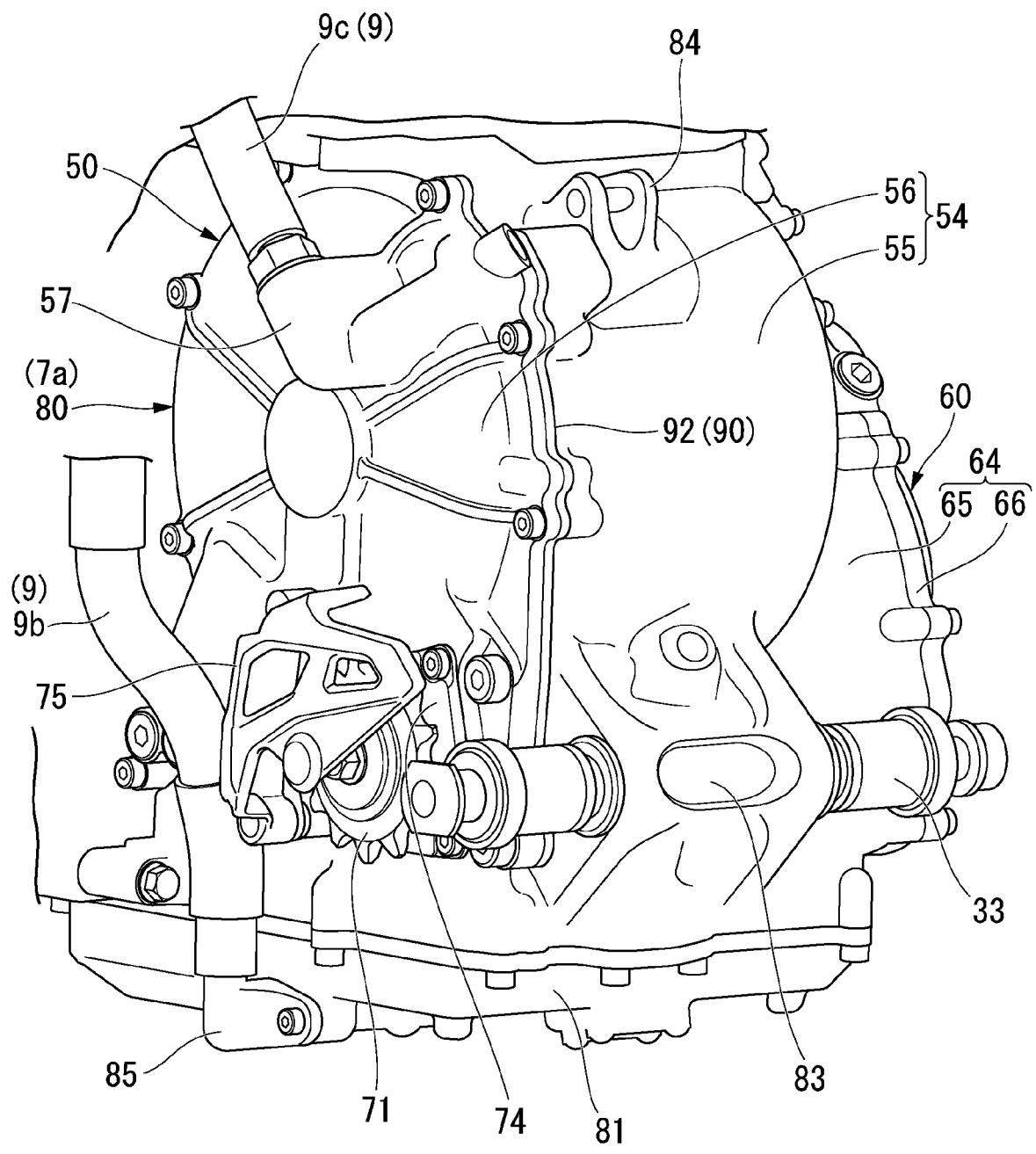
FIG. 4 is a perspective view of a power unit of the embodiment when seen from behind.

FIG. 4 is a perspective view showing the power unit of the embodiment from behind.

As shown in FIG. 3 and FIG. 4, the motor case 54 is a part of the housing 80 and forms an outer shell of the motor 50. An accommodating space S in which the stator 51 and the rotor 52 are accommodated is formed in the motor case 54. The motor case 54 is coaxial with the stator 51 and the rotor 52, and formed in a cylindrical shape, both ends of which are closed. The motor case 54 includes a motor case main body (a first member) 55 that is formed to cover the stator 51 and the rotor 52 from an outward side and a right side in the radial direction and that opens toward the left, and a motor cover (a second member) 56 configured to cover an opening of the motor case main body 55 on the left side.

As shown in FIG. 3, the motor case main body 55 includes an inner circumferential surface 55a and an end surface 55b. The inner circumferential surface 55a extends with a constant inner diameter in the vehicle width direction. The end surface 55b extends along a vertical surface of a central axis of the stator 51 while being directed leftward. The end surface 55b extends downward from an opening edge of the opening of the motor case main body 55 on the left side (see FIG. 5). The motor cover 56 is formed to cover the stator 51, the rotor 52 and the end surface 55b of the motor case main body 55 from the left side.

A discharge port 57 to which a pipeline 9c (to be described below) of the cooling apparatus 9 is connected is provided in the motor case 54 (see also FIG. 4). The discharge port 57 is provided on a side surface of the motor case 54 opposite to the reduction gear 60 in the vehicle width direction. The discharge port 57 is provided at a side opposite to the reduction gear 60 while having the vehicle width center CL sandwiched between the discharge port 57 and the reduction gear 60. The discharge port 57 is provided on a side surface directed toward a left side of the motor cover 56.

A shaft insertion hole 58 through which the output shaft 70 is inserted is formed in the motor case 54. The shaft insertion hole 58 is provided behind and below the accommodating space S. The shaft insertion hole 58 extends in the vehicle width direction. The shaft insertion hole 58 is formed across both of the motor case main body 55 and the motor cover 56. A right end of the shaft insertion hole 58 opens in a reduction gear case 64 (to be described below). A left end of the shaft insertion hole 58 opens toward an outward side of the housing 80 at an outer surface of the motor cover 56. A counter bore section 58a in which a first bearing 72 configured to support the output shaft 70 is received is formed in a left end portion of the shaft insertion hole 58. The counter bore section 58a is recessed inward (rightward) in the vehicle width direction at an outer surface directed toward a left side of the motor cover 56.

Figure 5:
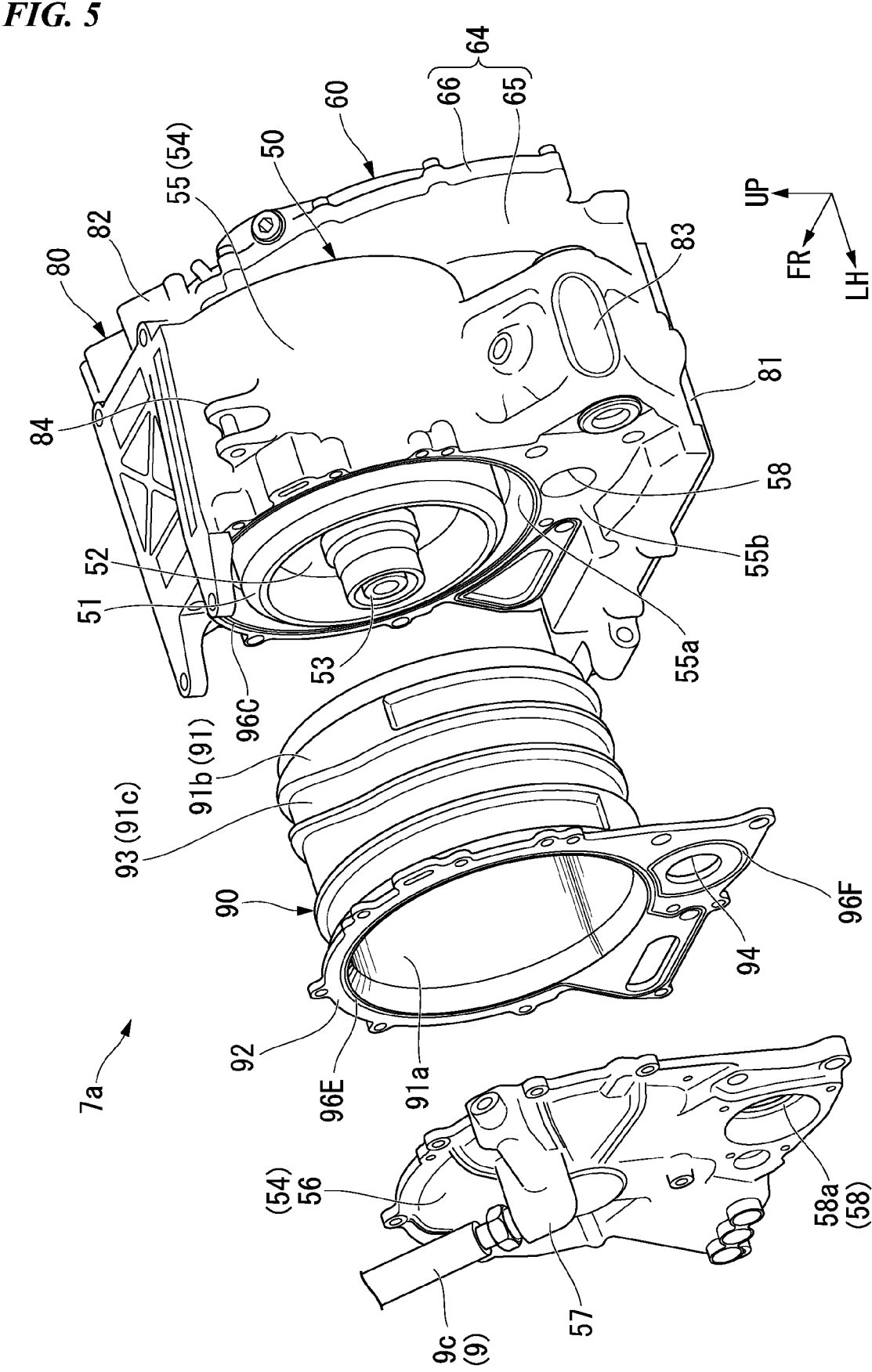
FIG. 5 is an exploded perspective view of a motor of the embodiment.

FIG. 5 is an exploded perspective view of a motor of the embodiment.

As shown in FIG. 4 and FIG. 5, the motor case main body 55 and the motor cover 56 are fastened to each other by a fastening tool such as a bolt or the like while having the water jacket 90 sandwiched between the motor case main body 55 and the motor cover 56. The motor case main body 55 and the motor cover 56 are fastened to an outer circumferential section of the motor cover 56. At least one of a plurality of fastening sections is provided at a side opposite to the inner circumferential surface 55a of the motor case main body 55 with the shaft insertion hole 58 sandwiched between the at least one fastening section and the inner circumferential surface 55a when seen from the vehicle width direction.

As shown in FIG. 3 and FIG. 5, the water jacket 90 is disposed to surround the stator 51 in the accommodating space S of the motor case 54. The water jacket 90 cools the stator 51 using cooling water. The water jacket 90 includes a cylindrical section 91 inserted into the motor case main body 55, and a flange section 92 overhanging outward from one end of the cylindrical section 91 in the radial direction.

As shown in FIG. 3, the cylindrical section 91 is formed in a cylindrical shape coaxial with the motor case 54. The cylindrical section 91 is disposed between the stator 51 and the motor case main body 55. An inner circumferential surface 91a of the cylindrical section 91 is fitted into an outer circumferential surface of the stator 51. An outer circumferential surface 91b of the cylindrical section 91 is adhered to the inner circumferential surface 55a of the motor case main body 55. A flow path 93 is formed in the cylindrical section 91. The flow path 93 is formed by covering a groove section 91c formed in the outer circumferential surface 91b of the cylindrical section 91 with the inner circumferential surface 55a of the motor case main body 55 from an outward side in the radial direction.

The flow path 93 extends in a spiral shape in the vehicle width direction while turning around the central axis of the stator 51 (see FIG. 5). An end portion of the flow path 93 on the side of the reduction gear 60 in the vehicle width direction communicates with an inside of a PCU case 81 (not shown). An end portion of the flow path 93 on the side of the motor cover 56 in the vehicle width direction communicates with an outside of the housing 80 through the discharge port 57 (not shown). Cooling water flows through the flow path 93 (to be described below in detail).

The flange section 92 protrudes from an end portion of the cylindrical section 91 in the vehicle width direction directed to a side opposite to the reduction gear 60. That is, the flange section 92 protrudes outward in the radial direction from an end portion of the cylindrical section 91 at a side opposite to the reduction gear 60 with respect to the vehicle width center CL in the vehicle width direction. The flange section 92 protrudes outward than the inner circumferential surface 55a of the motor case main body 55 in the radial direction. An outer circumferential shape of the flange section 92 substantially coincides with an outer circumferential shape of the motor cover 56. A through-hole 94 coaxial with the shaft insertion hole 58 formed in the motor case 54 is formed in the flange section 92. The flange section 92 is sandwiched between the motor case main body 55 and the motor cover 56. Both surfaces of the flange section 92 directed in the vehicle width direction form a sealing surface of the accommodating space S while the flange section 92 is being sandwiched between the motor case main body 55 and the motor cover 56 in the vehicle width direction.

As shown in FIG. 5, the flange section 92 is fastened to the motor case main body 55 by all fastening tools configured to fasten the motor case main body 55 and the motor cover 56. That is, the flange section 92 is fastened to the motor case main body 55 and the motor cover 56 at a side opposite to the cylindrical section 91 while having the through-hole 94 sandwiched between the side opposite to the cylindrical section 91 and the flange section 92 when seen from at least the vehicle width direction.

As shown in FIG. 3, a plurality of gaskets are disposed between the motor case 54 and the water jacket 90. The plurality of gaskets include a first gasket 96A, a second gasket 96B, a third gasket 96C, a fourth gasket 96D, a fifth gasket 96E and a sixth gasket 96F. For example, each of the plurality of gaskets is an annular seal member such as an O-ring or the like.

The first gasket 96A and the second gasket 96B are interposed between the inner circumferential surface 55a of the motor case main body 55 and the outer circumferential surface 91b of the cylindrical section 91 of the water jacket 90. The first gasket 96A is disposed on the side of the motor cover 56 with respect to the groove section 91c in the outer circumferential surface 91b of the cylindrical section 91 of the water jacket 90. The first gasket 96A is disposed in a groove formed in the outer circumferential surface 91b of the cylindrical section 91 of the water jacket 90. The second gasket 96B is disposed on the side of the reduction gear 60 with respect to the groove section 91c of the outer circumferential surface 91b of the cylindrical section 91 of the water jacket 90. The second gasket 96B is disposed in a groove formed in the outer circumferential surface 91b of the cylindrical section 91 of the water jacket 90.

The third gasket 96C is interposed between the end surface 55b of the motor case main body 55 on the side of the motor cover 56 and a surface of the flange section 92 of the water jacket 90 directed toward the reduction gear 60. The third gasket 96C is disposed along an opening edge of the motor case main body 55. The third gasket 96C is disposed in a groove formed in the motor case main body 55. Together with the first gasket 96A, the third gasket 96C blocks communication between the flow path 93 of the water jacket 90 and the outside of the motor case 54.

The fourth gasket 96D is interposed between an inner surface of the motor case main body 55 and an end surface of the cylindrical section 91 of the water jacket 90 on the side of the reduction gear 60. The third gasket 96C is disposed in a groove formed in an end surface of the cylindrical section 91 of the water jacket 90 on the side of the reduction gear 60. Together with the second gasket 96B, The fourth gasket 96D blocks communication between the flow path 93 of the water jacket 90 and the accommodating space S of the motor case 54.

The fifth gasket 96E is interposed between the surface of the flange section 92 of the water jacket 90 directed toward the motor cover 56 and the motor cover 56. The fifth gasket 96E is disposed to surround the opening of the cylindrical section 91 of the water jacket 90 on the side of the flange section 92. The fifth gasket 96E is disposed in a groove formed in the flange section 92 of the water jacket 90. The fifth gasket 96E blocks communication between the accommodating space S of the motor case 54 and the outside of the motor case 54.

The sixth gasket 96F is interposed between the surface of the flange section 92 of the water jacket 90 directed toward the motor cover 56 and the motor cover 56. The sixth gasket 96F is disposed to surround the through-hole 94 of the flange section 92 of the water jacket 90. The sixth gasket 96F is disposed in a groove formed in the flange section 92 of the water jacket 90.

As shown in FIG. 2, the reduction gear 60 includes a drive gear 61 fixed to a motor shaft (not shown) of the motor 50, a reduction gear 62 that is a two-speed gear meshed with the drive gear 61, a driven gear 63 fixed to the output shaft 70 and meshed with the reduction gear 62, and the reduction gear case 64 configured to accommodate the drive gear 61, the reduction gear 62 and the driven gear 63.

As shown in FIG. 2 and FIG. 3, the reduction gear case 64 is a part of the housing 80 and forms an outer shell of the reduction gear 60. The reduction gear case 64 is disposed on the right side of the motor case 54. The reduction gear case 64 protrudes outward from the motor case 54 in the vehicle width direction. The reduction gear case 64 is provided behind the front end of the housing 80. The reduction gear case 64 includes a reduction gear case main body 65 that is formed to cover the drive gear 61, the reduction gear 62 and the driven gear 63 from the forward/rearward direction and the upward/downward direction and that opens toward the right, and a reduction gear cover 66 configured to cover an opening of the reduction gear case main body 65 on the right side. The reduction gear case main body 65 is provided integrally with the motor case main body 55. That is, the longitudinal wall of the reduction gear case main body 65 on the left side is integrated with the longitudinal wall of the motor case main body 55 on the right side. The reduction gear cover 66 forms an external form of the reduction gear case 64 when seen from the vehicle width direction. The reduction gear cover 66 is formed to cover the drive gear 61, the reduction gear 62 and the driven gear 63 from the right side.

As shown in FIG. 3, the output shaft 70 is disposed on a rear lower section of the motor 50. The output shaft 70 is disposed in front of the pivot shaft 33 (see FIG. 2). The output shaft 70 extends in the vehicle width direction and is inserted through the shaft insertion hole 58 of the housing 80. A right end portion of the output shaft 70 protrudes in the reduction gear case 64. The above-mentioned driven gear 63 is fixed to the right end portion of the output shaft 70. A left end portion of the output shaft 70 protrudes toward an outward side of the housing 80. A front sprocket 71 is fixed to the left end portion of the output shaft 70.

As shown in FIG. 1, a chain 77 of a transmission mechanism disposed on the left side of the rear section of the vehicle body is wound on the front sprocket 71. The chain 77 is wound around a rear sprocket of the rear wheel 3 on the left side. Accordingly, an output of the motor 50 is transmitted to the rear wheel 3. As shown in FIG. 4, the front sprocket 71 is covered with a guard member 75 from the front, above and the outward side in the vehicle width direction. The guard member 75 is fastened to the motor case 54 (the motor cover 56).

As shown in FIG. 3, the output shaft 70 is inserted into the first bearing 72 and a second bearing 73, and supported by the first bearing 72 and the second bearing 73 to be rotatable with respect to the housing 80. The first bearing 72 is a ball bearing. The first bearing 72 is fitted into the counter bore section 58a of the shaft insertion hole 58 formed in the outer surface of the motor cover 56. The first bearing 72 is pushed by a bearing pressing member 74 from an outward side in the vehicle width direction. Accordingly, the first bearing 72 restricts movement in the vehicle width direction and is held in the counter bore section 58a. The bearing pressing member 74 is disposed between the motor cover 56 and the front sprocket 71 and fastened to the motor cover 56. A seventh gasket 76 is interposed between the bearing pressing member 74 and the motor cover 56. The seventh gasket 76 is disposed to surround the counter bore section 58a. The seventh gasket 76 seals a space in which the first bearing 72 is disposed together with the above-mentioned sixth gasket 96F. For example, the second bearing 73 is a needle bearing. The second bearing 73 is disposed on the side of the reduction gear 60 with respect to the first bearing 72. The second bearing 73 is inserted into the right end portion of the shaft insertion hole 58.

Figure 6:
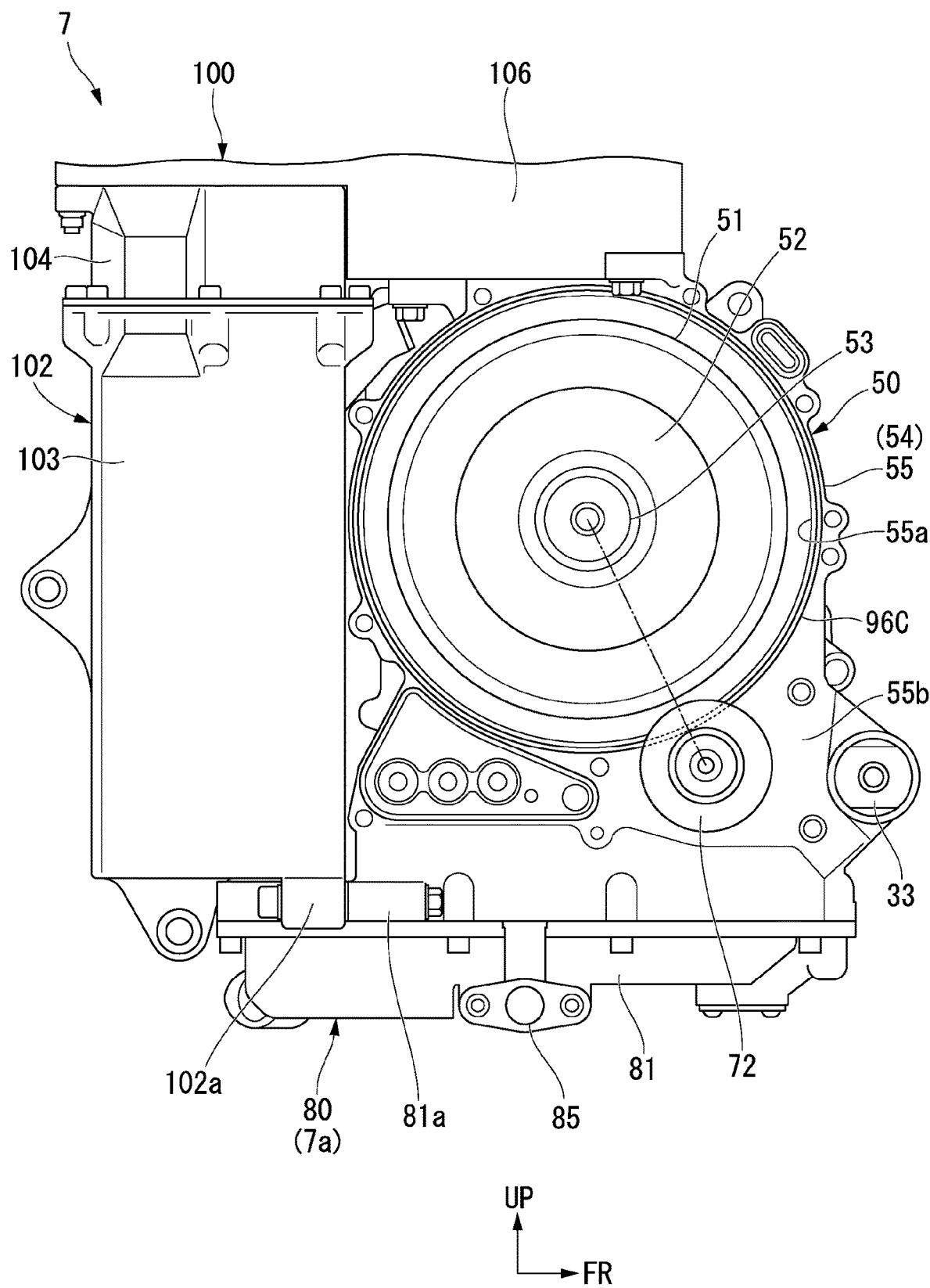
FIG. 6 is a side view of the power unit showing a positional relation between a gasket and a first bearing in a drive apparatus of the embodiment.
Figure 7:
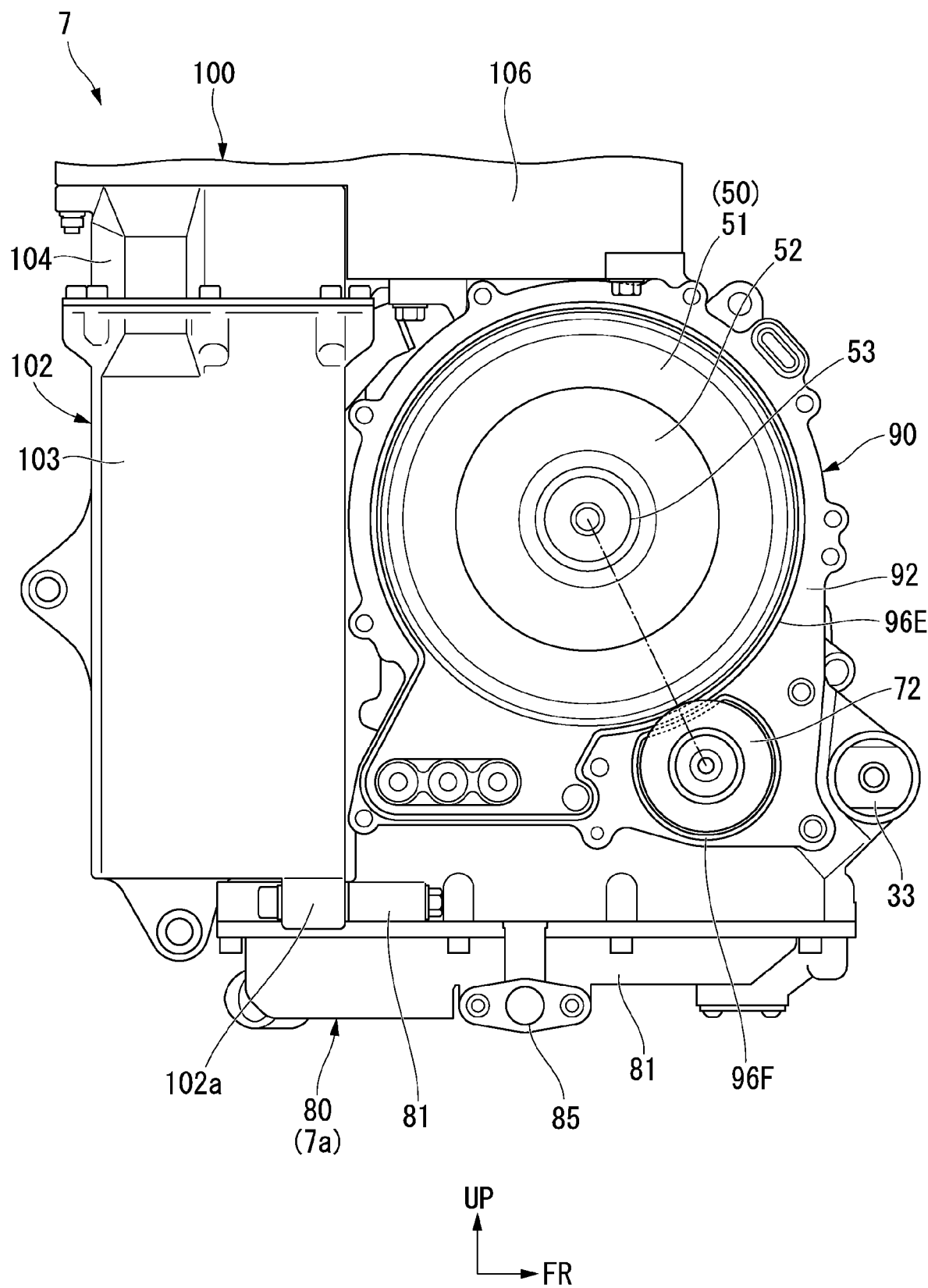
FIG. 7 is a side view of the power unit showing the positional relation between the gasket and the first bearing in the drive apparatus of the embodiment.

FIG. 6 and FIG. 7 are side views of the power unit showing positional relations between the gasket and the first bearing in the drive apparatus of the embodiment. FIG. 6 shows a state in which the water jacket 90 and the motor cover 56 are removed. FIG. 7 shows a state in which the motor cover 56 is removed.

As shown in FIG. 6, the first bearing 72 is disposed to overlap the third gasket 96C when seen from the vehicle width direction. Specifically, the first bearing 72 is disposed to overlap the third gasket 96C on a straight line that connects a rotational center of the output shaft 70 and a central axis of the stator 51 when seen from the vehicle width direction. In addition, as shown in FIG. 7, the first bearing 72 is disposed to overlap the fifth gasket 96E and the sixth gasket 96F when seen from the vehicle width direction. Specifically, the first bearing 72 is disposed to overlap the fifth gasket 96E and the sixth gasket 96F on the straight line that connects the rotational center of the output shaft 70 and the central axis of the stator 51 when seen from the vehicle width direction.

As shown in FIG. 2, the housing 80 includes the PCU case 81 and a cable case 82 in addition to the motor case 54 and the reduction gear case 64. The PCU case 81 is disposed below the motor case 54. The PCU case 81 is formed in a rectangular parallelepiped shape extending in the upward/downward direction, the forward/rearward direction and the vehicle width direction. The PCU case 81 has a space formed therein, and the PCU 130 is accommodated in the space (with reference to also FIG. 3). The PCU case 81 protrudes forward from the motor case 54.

As shown in FIG. 4, an introducing port 85 to which a pipeline 9b (to be described below) of the cooling apparatus 9 is connected is provided in the PCU case 81. The introducing port 85 is provided on a side surface of the PCU case 81 directed leftward. That is, the introducing port 85 is provided on a side opposite to the reduction gear 60 while the vehicle width center CL being sandwiched between the reduction gear 60 and the introducing port 85. The introducing port 85 allows the inside of the PCU case 81 and the outside of the housing 80 to communicate with each other.

The cable case 82 will be described below.

As shown in FIG. 2, the housing 80 includes a lower support section 83 and an upper support section 84 that are supported by the vehicle body frame 5. The lower support section 83 protrudes rearward from a rear lower section of the housing 80. A through-hole through which the pivot shaft 33 is inserted is formed in the lower support section 83. The lower support section 83 is supported by the pivot frames 18 via the pivot shaft 33 while being sandwiched between bifurcated front end portions of the swing arm 30 (see FIG. 1) from both sides in the vehicle width direction on the pivot shaft 33. The upper support section 84 protrudes rearward and upward from the rear upper section of the housing 80.

The upper support section 84 is supported by the cross member 22 via a pair of left and right first mount brackets 45.

The battery 100 is disposed on a front section and an upper section of the power unit 7. The battery 100 is disposed in front of and above the motor 50. The battery 100 includes a lower battery 102 and an upper battery 106. The lower battery 102 and the upper battery 106 are fastened to each other.

Figure 8:
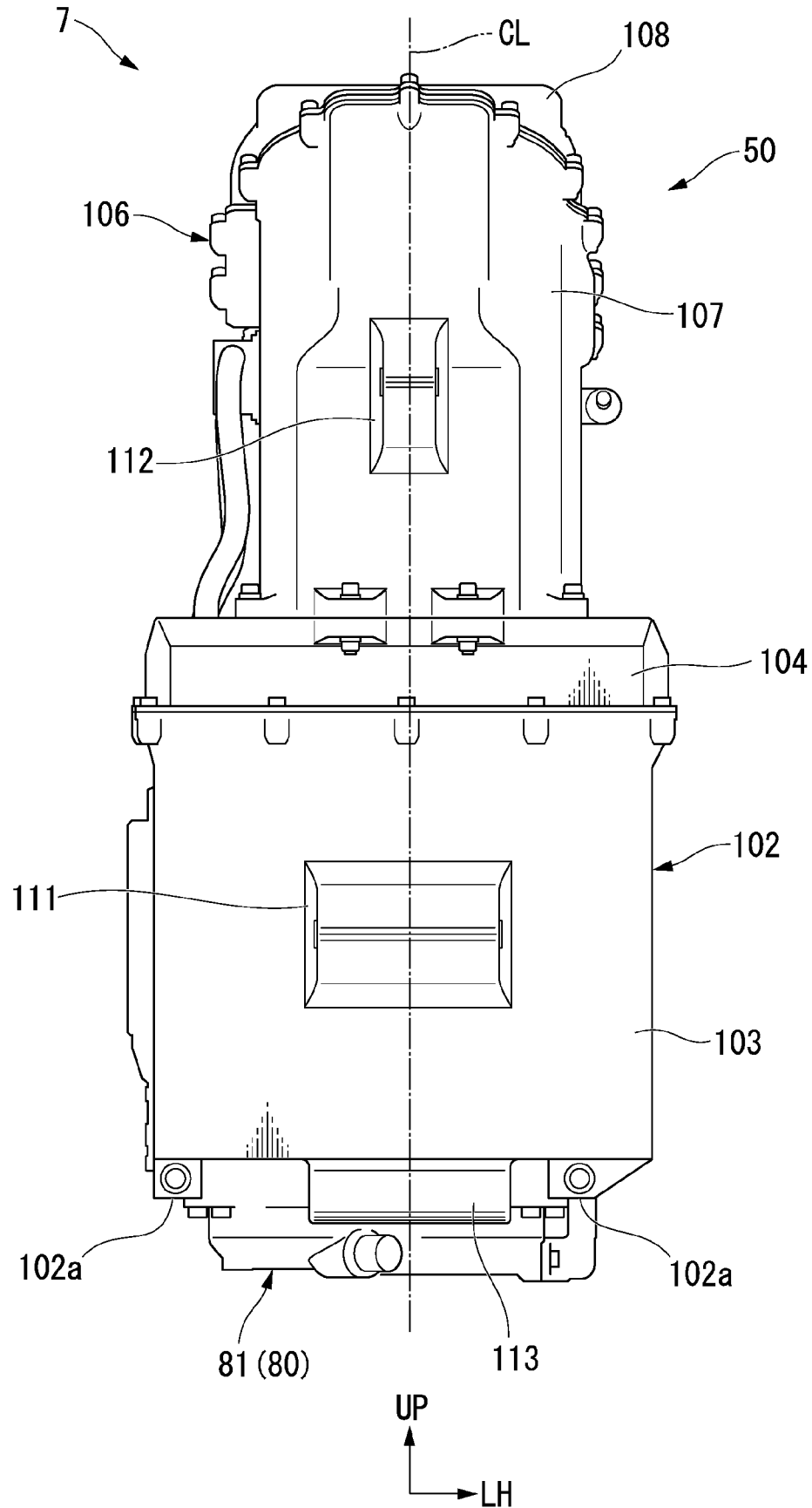
FIG. 8 is a front view of the power unit of the embodiment.

FIG. 8 is a front view of the power unit of the embodiment.

As shown in FIG. 2 and FIG. 8, the lower battery 102 is disposed in front of the motor 50. The lower battery 102 is formed in a rectangular parallelepiped shape extending in the upward/downward direction, the forward/rearward direction and the vehicle width direction. The lower battery 102 is disposed to overlap the vehicle width center CL when seen from the forward/rearward direction. The lower battery 102 is formed to be larger than the motor 50 in the vehicle width direction. The lower battery 102 protrudes toward both sides in the vehicle width direction with respect to the motor 50. The lower battery 102 protrudes upward from the housing 80.

As shown in FIG. 2, a casing of the lower battery 102 is formed to be divided into upper and lower sides along a virtual plane extending in a substantially horizontal direction, and an upper section constitutes a lid body 104 while a lower section constitutes a case main body 103. The case main body 103 and the lid body 104 are fixed to each other by a plurality of fastening tools configured to fasten opening edges thereof.

A pair of left and right leg sections 102a fastened to the housing 80 is provided on a lower end portion of the lower battery 102. The pair of leg sections 102a is provided to protrude downward. The pair of leg sections 102a are disposed to sandwich an upper section of a front end portion of the PCU case 81 from an outward side in the vehicle width direction. The pair of leg sections 102a are fastened to a fastening seat 81a protruding outward from the PCU case 81 in the vehicle width direction from the front.

The upper battery 106 is disposed above the motor 50 and the lower battery 102.

The upper battery 106 is disposed between the pair of main frames 17. The upper battery 106 is disposed between the pair of gussets 21 (see FIG. 1). The upper battery 106 is formed to be larger than the lower battery 102 in the forward/rearward direction.

As shown in FIG. 8, the upper battery 106 is disposed to overlap the vehicle width center CL when seen from the forward/rearward direction. The upper battery 106 extends in the upward/downward direction with a substantially constant width when seen from the forward/rearward direction. The upper battery 106 is formed to be smaller than the lower battery 102 in the vehicle width direction. Accordingly, the lower battery 102 protrudes than the upper battery 106 toward both sides in the vehicle width direction.

As shown in FIG. 2, the front section of the upper battery 106 is disposed above the lower battery 102. A lower surface of the front section of the upper battery 106 is adhered to an upper surface of the lid body 104 of the lower battery 102. The rear section of the upper battery 106 is disposed above the motor 50. The rear section of the upper battery 106 protrudes downward from the front section of the upper battery 106. A front surface of a lower end portion of the rear section of the upper battery 106 is adhered to a rear surface of the lid body 104 of the lower battery 102. A lower surface of the rear section of the upper battery 106 is provided along the upper surface of the motor case 54. A rear surface of the upper battery 106 is formed in a stepped shape such that the lower section is disposed forward with respect to the upper section to avoid the cross member 22. An upper section of the front surface of the upper battery 106 swells forward. A lower section of the front surface of the upper battery 106 extends along the same plane as the front surface of the lower battery 102. The upper surface of the upper battery 106 extends in a substantially horizontal direction from the front toward the rear, and then, extends downward obliquely.

A casing of the upper battery 106 is formed to be divided into upper and lower sides along a virtual plane extending rearward and downward from an upper front end portion thereof, and an upper section constitutes a lid body 108 while a lower section constitutes a case main body 107. The entire lid body 108 is disposed above the pair of main frames 17. The case main body 107 and the lid body 108 are fixed to each other by a plurality of fastening tools configured to fasten the opening edges thereof.

The front section of the upper battery 106 is fastened to the lid body 104 of the lower battery 102. The rear section of the upper battery 106 is fastened to the upper section of the motor case 54 and the rear upper section of the lower battery 102.

The battery 100 includes a support section 111 under the front surface, a support section 112 on the front surface and a support section 113 on the lower surface that are supported by the vehicle body frame 5.

The support section 111 under the front surface extends in the vehicle width direction while protruding forward from the front surface of the lower battery 102. The support section 111 under the front surface is supported by the down frame 19 via a pair of left and right second mount brackets 46. The pair of second mount brackets 46 are disposed to sandwich the support section 111 under the front surface from an outward side in the vehicle width direction and fastened to the support section 111 under the front surface. Further, the pair of second mount brackets 46 is fastened to the down frame 19.

The support section 112 on the front surface extends in the vehicle width direction while protruding forward from the front surface of the upper battery 106. The support section 112 on the front surface is supported by the down frame 19 via a pair of left and right third mount brackets 47. The pair of third mount brackets 47 are disposed to sandwich the support section 112 on the front surface from an outward side in the vehicle width direction, and fastened to the support section 112 on the front surface. Further, the pair of third mount brackets 47 are fastened to the down frame 19.

The support section 113 on the lower surface extends in the vehicle width direction while protruding downward from the lower surface of the lower battery 102. The support section 113 on the lower surface is sandwiched between a pair of extension sections 20a extending from the pair of lower frames 20 from an outward side in the vehicle width direction. The support section 113 on the lower surface is fastened to the pair of extension sections 20a. Accordingly, the support section 113 on the lower surface is supported by the lower frame 20.

A pair of high voltage electric wires 120 connected to the PCU 130 extend from the battery 100. The pair of high voltage electric wires 120 are disposed on the same side as the reduction gear 60 (i.e., a right side) with respect to the vehicle width center CL. The pair of high voltage electric wires 120 extend from the upper battery 106. The pair of high voltage electric wires 120 are disposed to overlap the battery 100 or the motor 50 when seen from the vehicle width direction.

The pair of high voltage electric wires 120 are covered with the cable case 82 at a position overlapping the motor 50 when seen from the vehicle width direction. The cable case 82 is disposed between the reduction gear case main body 65 and the lower battery 102 when seen from the vehicle width direction. For example, a part of the cable case 82 extends from the motor case main body 55. A high voltage electric wire 120 enters the PCU case 81 from the inside of the cable case 82 at the lower section of the cable case 82.

The PCU 130 is a control device including a power drive unit (PDU) that is a motor driver, an electric control unit (ECU) configured to control the PDU, or the like. The PDU includes an inverter, converts the current supplied from the battery 100 from direct current into alternating current, and supplies electricity to the motor 50. The PCU 130 is accommodated in the PCU case 81 of the housing 80.

As shown in FIG. 1, the cooling apparatus 9 circulates cooling water, and cools the drive apparatus 7a. The cooling apparatus 9 includes a radiator 9a configured to cool the cooling water, the pair of pipelines 9b and 9c configured to connect the radiator 9a and the drive apparatus 7a, and a pump (not shown) configured to pump the cooling water. The radiator 9a is attached to the down frame 19. The pipeline 9b connects the radiator 9a and the introducing port 85 of the PCU case 81. The pipeline 9c connects the radiator 9a and the discharge port 57 of the motor case 54.

As shown in FIG. 3 and FIG. 4, the cooling water delivered from the radiator 9a is introduced into the PCU case 81 through the introducing port 85. The cooling water introduced into the PCU case 81 flows through the PCU case 81 toward the reduction gear 60 in the vehicle width direction, and then, is introduced into an end portion of the flow path 93 of the water jacket 90 on the side of the reduction gear 60 in the vehicle width direction. The cooling water flows through the flow path 93 in a direction separated from the reduction gear 60 in the vehicle width direction while spirally turning around the stator 51 in the water jacket 90. After that, the cooling water is discharged from the discharge port 57, and returns to the radiator 9a through the pipeline 9c.

As described above, the electric bicycle 1 of the embodiment includes the water jacket 90 disposed to surround the stator 51 in the accommodating space S of the motor case 54 and configured to cool the motor 50, and the water jacket 90 includes the flange section 92 protruding outward in the radial direction of the stator 51 while the flange section (92) being formed in the water jacket (90) at a side opposite to the reduction gear 60 in the vehicle width direction. According to the configuration, during maintenance of the motor 50 that requires attachment to and detachment from the water jacket 90, when the water jacket 90 is displaced toward a side opposite to the reduction gear 60 in the vehicle width direction, the water jacket 90 can be removed from the motor case 54 while avoiding interference with the flange section 92 and the motor case 54. That is, the water jacket 90 can be attached to and detached from the motor 50 without removing the reduction gear 60. Accordingly, improvement in maintenance properties of the motor 50 can be achieved.

Here, when the drive apparatus does not include the reduction gear, there is a need to form the driven gear having a larger diameter than that of the front sprocket and to reduce output of the motor. When the driven gear has a large diameter, in order to avoid interference with the pivot shaft and the driven gear, a clearance between the output shaft and the pivot shaft is increased. If the clearance between the output shaft and the pivot shaft is increased, when the rear wheel swings about the pivot shaft, looseness is likely to occur in the chain of the transmission mechanism. In the embodiment, since the reduction gear 60 configured to reduce output of the motor 50 is provided, a reduction ratio can be increased with no increase in difference in outer diameter between the driven gear 63 and the front sprocket 71. Accordingly, the output shaft 70 and the pivot shaft 33 can be disposed close to each other, and occurrence of looseness of the chain 77 of the transmission mechanism according to vertical swinging of the rear wheel 3 can be suppressed.

In addition, the reduction gear 60 and the front sprocket 71 are disposed at opposite sides in the vehicle width direction while having the motor case 54 sandwiched between the reduction gear 60 and the front sprocket 71. According to the configuration, since parts related to the reduction gear 60 and the front sprocket 71 are disposed dispersively at both sides in the vehicle width direction while having the motor case 54 sandwiched between the reduction gear 60 and the front sprocket 71, the output shaft 70 can be disposed at a position close to a rotational center of the motor 50. Accordingly, reduction in size of the drive apparatus 7a can be achieved. In addition, a distance between a center of gravity of the motor 50 that is a heavy substance and the output shaft 70 is reduced, and steering performance of the vehicle can be improved.

In addition, the motor case main body 55 and the motor cover 56 of the motor case 54 are fastened to each other while having the flange section 92 of the water jacket 90 sandwiched between the motor case main body 55 and the motor cover 56, and the through-hole 94 through which the output shaft 70 is inserted is formed in the flange section 92. Here, in order to secure sealability between the flange section and the motor case, there is a need to provide the fastening section between the motor case main body and the motor cover throughout the circumference of the flange section. When the output shaft is disposed at a further outward side than the flange section, i.e., when the through-hole through which the output shaft is inserted is not formed in the flange section, the fastening section between the motor case main body and the motor cover needs to be provided between the output shaft and the flange section when seen from the vehicle width direction. For this reason, an interval between the output shaft and the stator is increased when seen from the vehicle width direction, and the drive apparatus may be increased in size. On the other hand, according to the configuration of the embodiment, when the fastening section is provided on the outer circumferential side of the flange section 92 with respect to the through-hole 94, even though the fastening section between the motor case main body 55 and the motor cover 56 is not provided on the inner circumferential side of the flange section 92 with respect to the through-hole 94, the motor case main body 55 and the motor cover 56 can be fastened throughout the circumference of the flange section 92. Accordingly, the output shaft 70 can be disposed at a position closer to the stator 51 while securing sealability between the flange section 92 and the motor case 54. Accordingly, reduction in size of the drive apparatus 7a can be achieved.

In addition, the first bearing 72 overlaps the third gasket 96C, the fifth gasket 96E and the sixth gasket 96F between the output shaft 70 and the stator 51 when seen from the vehicle width direction. According to the configuration, when seen from the vehicle width direction, since the first bearing 72 configured to support the output shaft 70 overlaps the third gasket 96C, the fifth gasket 96E and the sixth gasket 96F disposed between the output shaft 70 and the stator 51 when seen from the vehicle width direction, the output shaft 70 can be disposed at a position closer to the stator 51. Accordingly, reduction in size of the drive apparatus 7a can be achieved while securing sealability between the flange section 92 and the motor case 54 using the third gasket 96C, the fifth gasket 96E and the sixth gasket 96F.

In addition, the discharge port 57 configured to discharge cooling water is formed in the motor cover 56. According to the configuration, since the discharge port 57 is disposed at a side opposite to the reduction gear 60 while having the motor case 54 sandwiched between the reduction gear 60 and the discharge port 57, when the pipeline 9c of the cooling apparatus 9 is attached to and detached from the discharge port 57, the reduction gear 60 does not become a hindrance. Accordingly, during maintenance of the motor 50 that requires attachment to and detachment from the pipeline 9c, improvement of maintenance properties can be achieved.

In addition, the flow path 93 spirally extending around the stator 51 is formed in the water jacket 90. According to the configuration, the entire stator 51 can be cooled evenly. Accordingly, it is possible to provide the electric bicycle 1 in which the motor 50 has good cooling performance.

In addition, the PCU 130 is disposed below the motor 50, and the cooling water supplied to the water jacket 90 goes through the PCU 130. According to the configuration, it is possible to cool the PCU 130 and the motor 50 using a single flow path of the cooling water. Accordingly, a structure of the drive apparatus 7a can be simplified, and improvement in maintenance properties of the motor 50 can be achieved.

Further, the present invention is not limited to the above-mentioned embodiment described with reference to the accompanying drawings, and various variants are considered without departing from the technical scope of the present invention.

For example, in the embodiment, while application to the electric bicycle for offroad traveling has been exemplarily described, the use of the vehicle is not limited at all.

For example, all vehicles on which a driver rides on the vehicle body are included as the saddle-type electric vehicle, and in addition to a motorcycle, a three-wheeled vehicle (including a two-front-wheeled and one-rear-wheeled vehicle in addition to one-front-wheeled and two-rear-wheeled vehicle) is also included.

In addition, in the embodiment, while the flow path 93 of the water jacket 90 is formed by the groove section 91c formed in the outer circumferential surface 91b of the cylindrical section 91, there is no limitation thereto. The flow path of the water jacket may be a pipeline extending in the water jacket.

In addition, in the embodiment, while an O-ring is exemplified as an example of each of the gaskets, there is no limitation thereto. For example, the gasket may be an annular seal member having a rectangular cross section.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. A saddle-type electric vehicle comprising:
a motor that includes a stator and a rotor and that is driven by a power supply from a battery;
a reduction gear that is disposed on one side of the motor in a vehicle width direction and that is configured to reduce a speed of an output of the motor;
an output shaft that extends in the vehicle width direction and that is configured to output power of the motor in which the speed thereof has been reduced by the reduction gear;
a sprocket that is fixed to the output shaft and that is disposed on the other side of the motor in the vehicle width direction;
a housing having an accommodating space in which the stator and the rotor are accommodated; and
a water jacket that is disposed to surround the stator in the accommodating space and that is configured to cool the motor,
wherein the water jacket comprises a flange section protruding outward in a radial direction of the stator, the flange section being formed in the water jacket at a side opposite to the reduction gear in the vehicle width direction,
wherein the housing comprises a first member and a second member,
the first member and the second member are fastened to each other while having the flange section sandwiched between the first member and the second member, and
a through-hole through which the output shaft is inserted is formed in the flange section.

2. The saddle-type electric vehicle according to claim 1, wherein a discharge port configured to discharge cooling water from the water jacket is formed in the housing, and
the discharge port is provided on a side surface of the other side of the housing in the vehicle width direction.

3. The saddle-type electric vehicle according to claim 1, wherein a flow path spirally extending around the stator is formed in the water jacket.

4. A saddle-type electric vehicle comprising:
a motor that includes a stator and a rotor and that is driven by a power supply from a battery;
a reduction gear that is disposed on one side of the motor in a vehicle width direction and that is configured to reduce a speed of an output of the motor;
an output shaft that extends in the vehicle width direction and that is configured to output power of the motor in which the speed thereof has been reduced by the reduction gear;
a sprocket that is fixed to the output shaft and that is disposed on the other side of the motor in the vehicle width direction;
a housing having an accommodating space in which the stator and the rotor are accommodated; and
a water jacket that is disposed to surround the stator in the accommodating space and that is configured to cool the motor,
wherein the water jacket comprises a flange section protruding outward in a radial direction of the stator, the flange section being formed in the water jacket at a side opposite to the reduction gear in the vehicle width direction,
the saddle-type electric vehicle further comprising:
a bearing configured to rotatably support the output shaft with respect to the housing; and
gaskets interposed between the flange section and the housing, wherein the bearing overlaps the gaskets between the output shaft and the stator when seen from the vehicle width direction.

5. The saddle-type electric vehicle according to claim 4, wherein a discharge port configured to discharge cooling water from the water jacket is formed in the housing, and
the discharge port is provided on a side surface of the other side of the housing in the vehicle width direction.

6. The saddle-type electric vehicle according to claim 4, wherein a flow path spirally extending around the stator is formed in the water jacket.

7. A saddle-type electric vehicle comprising:
a motor that includes a stator and a rotor and that is driven by a power supply from a battery;
a reduction gear that is disposed on one side of the motor in a vehicle width direction and that is configured to reduce a speed of an output of the motor;
an output shaft that extends in the vehicle width direction and that is configured to output power of the motor in which the speed thereof has been reduced by the reduction gear;
a sprocket that is fixed to the output shaft and that is disposed on the other side of the motor in the vehicle width direction;
a housing having an accommodating space in which the stator and the rotor are accommodated; and
a water jacket that is disposed to surround the stator in the accommodating space and that is configured to cool the motor,
wherein the water jacket comprises a flange section protruding outward in a radial direction of the stator, the flange section being formed in the water jacket at a side opposite to the reduction gear in the vehicle width direction,
the saddle-type electric vehicle further comprising an inverter configured to convert current supplied from the battery into alternating current and configured to supply the current to the motor,
wherein the inverter is disposed below the motor, and
cooling water supplied to the water jacket goes through the inverter.

8. The saddle-type electric vehicle according to claim 7, wherein a discharge port configured to discharge cooling water from the water jacket is formed in the housing, and
the discharge port is provided on a side surface of the other side of the housing in the vehicle width direction.

9. The saddle-type electric vehicle according to claim 7, wherein a flow path spirally extending around the stator is formed in the water jacket.

* * * * *